J. L. ARMS.
Rice Cleaners.
No. 141,194.  Patented July 29, 1873.
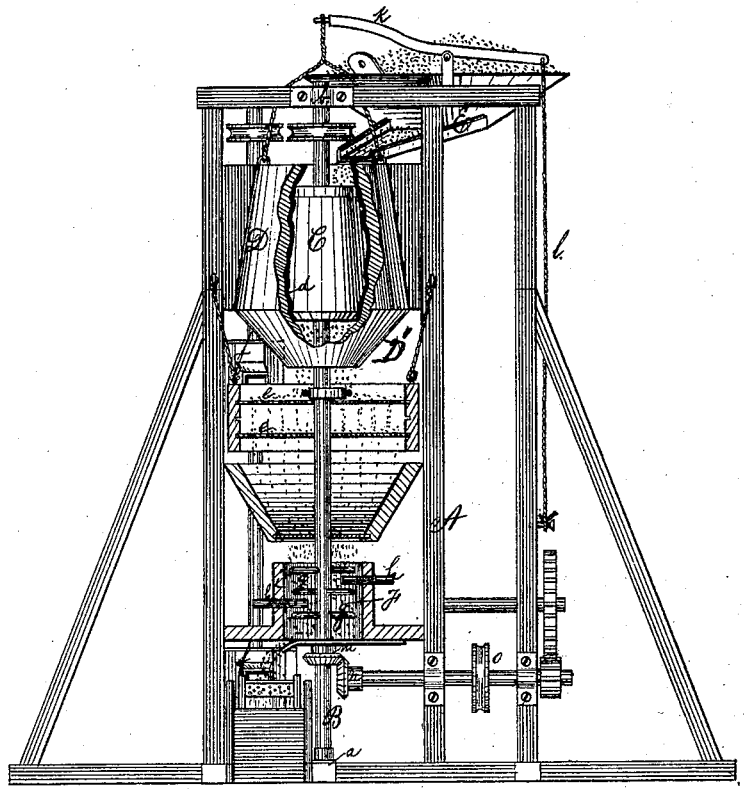
WITNESSES.  INVENTOR.

UNITED STATES PATENT OFFICE.

JOHN L. ARMS, OF NEW ORLEANS, LOUISIANA.

IMPROVEMENT IN RICE-CLEANERS.

Specification forming part of Letters Patent No. 141,194, dated July 29, 1873; application filed February 13, 1873.

*To all whom it may concern:*

Be it known that I, JOHN L. ARMS, of the city of New Orleans, parish of Orleans and State of Louisiana, have invented a new, useful, and Improved Machine for Hulling, Cleaning, and Polishing Rice; and I hereby declare the following to be a full, clear, and correct description of the same, reference being had to the accompanying illustrative drawing and to the letters of reference marked thereon, all of which constitute a part of this specification.

My improvement relates to a mechanical device through the agency of which I am enabled economically and effectually to remove not only the outer hulls from what is technically known as "rough rice," but likewise to thoroughly remove the inner coating or cuticle from the grain; and when the said hulls and cuticle are so removed the rice is polished and delivered from the machine in a condition suitable for sale and consumption.

My improvement, however, will be more clearly understood by referring to the drawing annexed, whereon the similar letters of reference indicate corresponding parts of the invention.

My improvement is shown upon said drawing by a side elevation, with portions thereof broken away to the end of exposing more clearly to view certain of its internal working parts.

A is a substantial frame of timber, upon the lower part of which is placed a step, $a$, in which rests a vertical shaft, B, supported or held in position at its upper extremity by the journal-box $b$. Upon the said shaft B is placed the inner cone C, which is surrounded by a cover of sheet-rubber. The said inner cone C is jacketed by the outer hollow cone D, the interior surface of which is likewise lined or covered with sheet-rubber, as shown at $d$. Sufficient space is allowed to intervene between the exterior surface of the said inner cone C and the inner rubber surface of the jacket D to admit the rice from the hopper E. The horizontal rotation of the said shaft B, and consequently of the cone C, which is rigidly secured thereto, by which means the rubber surface of the inner cone C and jacket D are brought very closely together, effects the operation of removing the outer hulls from the rice, as well as a portion of the inner coating or cuticle pertaining thereto.

By reference to the drawing it will be seen that the outer or jacket cone-shaped cylinder D is so formed at its base as to leave an inverted cone or funnel-shaped chamber, $D'$, and to which the rice and hulls alike pass after having been separated through the action of the cones C and D, and from which chamber they are fed to the series of screens or sieves $e\ e$. The form of this chamber $D'$ is important, as it contracts the mass and causes it to be fed in proper form and quantity to the sieves, so as to insure their most direct and effective action.

The said inner cone C and jacket D constitute what may not improperly be termed the "primary huller," from which are delivered the rice, with a portion of the inner coating or cuticle adhering thereto, and the outer hulls which have been removed therefrom. These outer hulls are separated from the rice grains by means of the series of sieves or screens $e$, through the smaller perforations of which the rice falls, while the hulls are blown away through the agency of a fan placed at any convenient position to operate for that purpose. The said fan is shown in the rear of my device, as indicated by the dotted lines at $f$.

The secondary huller and polisher, or that part of my apparatus which removes the inner coating or cuticle from the rice, is shown at F, and consists simply of a series of radial arms, $g$, which are secured to the shaft B, and of the arms $h$, which project from the jacket $i$. The said arms $g$ and $h$, as likewise the inner surface of the said jacket $i$, are usually covered with sheep-skin having the wool thereon, or they may be covered with rubber or any other suitable soft material.

The rotations of the shaft B, and consequently of the arms $g$ provided with sheep-skin, as above mentioned, effectually perform the operation of removing the cuticle from the rice as it is brought into contact therewith.

As the rice is delivered from the secondary huller F it is easily separated from the bran or cuticle by means of a fan, which I believe it is scarcely necessary to describe for this specification.

The space between the inner cone C and the jacket D of the primary huller may be enlarged or contracted simply by raising or lowering the said jacket D, which operation may be effected by means of the lever K and cords $l$ connected therewith; or the same operation may be effected by other means, which it is not necessary herein to describe.

Motion may be imparted to the said vertical shaft B by the bevel gearing and pulley shown at $m$, $n$, and $o$, by steam, animal or hand power, as may be desired.

I have demonstrated by a working device the utility and efficiency of my invention, and having described the parts thereof which I claim as new, and for which I desire to secure Letters Patent, what I claim is the following:

1. The huller and separator consisting of the cones C D provided with rubber, as stated, shaft B, the series of sieves or screens $e\ e$, and the fan $f$, the whole being constructed, combined, and arranged to operate substantially as described.

2. The huller and polisher F, consisting of the tube or jacket $i$ having radial arms $h\ h$, and the shaft B having radial arms $d\ d$, the arms of each being covered with sheep-skin, rubber, or other soft material, substantially as described, as and for the purpose specified.

J. L. ARMS.

Witnesses:
  H. N. JENKINS,
  JAMES C. KIDDELL.